United States Patent [19]
Gauthier et al.

[11] Patent Number: 6,126,717
[45] Date of Patent: Oct. 3, 2000

[54] STEEL-MAKING METHOD AND PLANT

[75] Inventors: Pierre Gauthier, Fresnes; Jérôme Jutard, La Riche; Xavier Vigor, Paris, all of France

[73] Assignee: L'Air Liquide, Societe Anonyme pour l'Etude et l'Exploitation des Procedes Georges Claude, Paris Cedex, France

[21] Appl. No.: 09/117,381

[22] PCT Filed: Jan. 29, 1997

[86] PCT No.: PCT/FR97/00175

§ 371 Date: Jul. 29, 1998

§ 102(e) Date: Jul. 29, 1998

[87] PCT Pub. No.: WO97/28284

PCT Pub. Date: Aug. 7, 1997

[30]     Foreign Application Priority Data

Feb. 1, 1996 [FR] France .................................. 96 01219

[51] Int. Cl.$^7$ .................................................. C21B 5/06
[52] U.S. Cl. ............................................ 75/466; 266/160
[58] Field of Search ................................ 75/466; 266/160

[56]            References Cited

U.S. PATENT DOCUMENTS 5,244,489  9/1993  Grenier ..................................... 75/466
5,268,019  12/1993 Rathbone ................................. 75/466
5,582,029  12/1996 Occhialini et al. ....................... 62/636

FOREIGN PATENT DOCUMENTS

| 0 225 864 | 6/1987 | European Pat. Off. . |
| 0 487 856 | 6/1992 | European Pat. Off. . |
| 0 488 429 | 6/1992 | European Pat. Off. . |
| 0 503 900 | 9/1992 | European Pat. Off. . |
| 2 150 855 | 7/1985 | United Kingdom . |

*Primary Examiner*—Melvyn Andrews
*Attorney, Agent, or Firm*—Young & Thompson

[57]            ABSTRACT

A method wherein air is separated in an air separation unit (9), the oxygen thus generated is consumed during at least one step (2, 12, 13) of the steel-making process, the resulting gas is at least partially decarbonated, and the at least partially decarbonated gas is used (at 13) in a reduction reaction of the steel-making process. The partial decarbonation step cyclically includes a $CO_2$ fixation step using a fixation agent, and a regeneration step in which the agent is regenerated in a reactor. Nitrogen generated by the air separation unit (9) is fed into the reactor during the fixation agent regeneration step. The method is useful in combined coal gassification/direct iron ore reduction processes.

13 Claims, 2 Drawing Sheets stage of international application PCT/FR97/00175 filed on Jan. 29, 1997, which designated the United States of America.

FIELD OF THE INVENTION

The present invention relates to a ferrous metallurgical process, of the type in which air is separated in an air separation unit, oxygen thus produced is consumed in at least one step of the ferrous metallurgical process, a gas from this ferrous metallurgical process is partially decarbonted, and this partially decarbonated gas is used to carry out a reduction reaction of the ferrous metallurgical process, the partial decarbonation comprising, in a cyclical manner, a phase of fixation of $CO_2$ by a fixation product, then a phase of regeneration of this product in a reactor.

BACKGROUND OF THE INVENTION

A process of this type is at present known under the mark "COREX" of the Austrian company VOEST-ALPINE INDUSTRIES ANLAGENEBAU.

Other examples of processes of this type are the process HyL III commercialized by the Mexican company HYLSA, or the all-oxygen blast furnace process introduced by the Japanese company NKK.

The solutions that have been proposed to carry out the partial decarbonation of the mentioned gas are either a washing with amines, or a selective adsorption with pressure variation and with vacuum. In the first case, the regeneration of the washing solution uses large quantities of steam, and in the second gas, the vacuum pumps required are expensive as to cost and energy consumption.

SUMMARY OF THE INVENTION

The invention has for its object to improve the economy of the partial decarbonation. To this end, it has for its object a process of the mentioned type, characterized in that in the course of the regeneration phase of the product of fixation, there is introduced into the reactor nitrogen produced by the air separation unit.

The process according to the invention can comprise one or several of the following characteristics:

the fixation of $CO_2$ is an absorption by a solvent, said reactor is a regeneration tower for this solvent into which nitrogen is introduced;

the solvent is constituted by at least one amine, particularly methyldiethylamine (MDEA), and the regeneration tower comprises at its base a steam reboiler and at its head a water condenser;

the fixation of the $CO_2$ is a selective adsorption by a PSA (Pressure Swing Adsorption) process, particularly with four adsorbers, the nitrogen being introduced counter-current into the adsorber, during its regeneration, in an elution step of the latter at the low pressure of the PSA cycle;

the PSA cycle comprises, at the low pressure of the cycle, the elution step with nitrogen followed by a counter-current elution step with a gas withdrawn co-currently from another adsorber in the course of decompression;

the adsorbent is a zeolite 5A heated to a temperature higher than about 50° C.;

the process constitutes a combined process of gasification of carbon and direct reduction of iron mineral, said gas being gas resulting from the gasification and/or ass resulting from the direct reduction of the iron mineral.

The invention also has for its object a ferrous metallurgical installation adapted to practice the process defined above. This installation, of the type comprising at least a first oxygen consuming apparatus, a second apparatus, if desired distinct from the first, producing a gas which contains $CO_2$, a partial decarbonation unit for this gas, a third apparatus, if desired separate from the first and/or second apparatus, in which is carried out a reduction reaction, means to supply to this third apparatus the partially decarbonated gas, and an air separation unit adapted to produce the oxygen necessary for said first apparatus, the partial decarbonation unit comprising means for fixing $CO_2$ by a fixation product and means for regenerating this product, is characterized in that the nitrogen outlet of the air separation unit is connected to the regeneration means of the fixation product.

According to other characteristics of this installation:

the partial decarbonation unit comprises an absorber, a regeneration tower, and means to circulate a solvent for the $CO_2$ from the adsorber to the tower and vice versa, the tower comprising a nitrogen inlet connected to the nitrogen outlet of the air separation unit;

the decarbonation unit is a selective adsorption unit PSA (Pressure Swing Adsorption) which comprises means for selective connection of the outlet of each adsorber to the nitrogen outlet of the air separation unit;

the adsorbent is a zeolite 5A, each adsorber being provided with heating means.

BRIEF DESCRIPTION OF THE DRAWINGS

Examples of operation of the invention will now be given with respect to the accompanying drawings, in which.

DETAILED DESCRIPTION OF THE INVENTION

Figure 1:
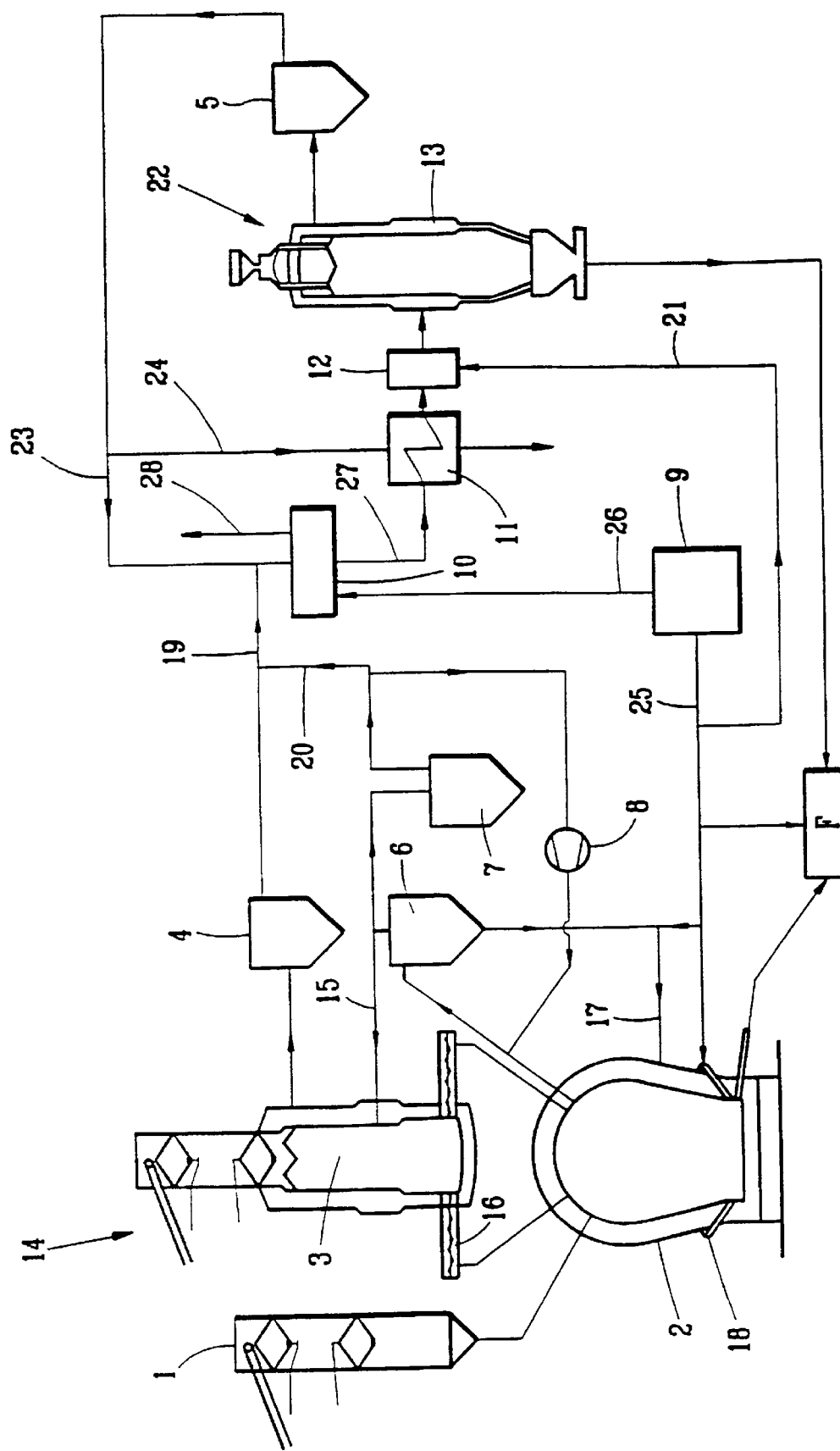
FIG. 1 shows schematically a ferrous metallurgical installation according to the invention.

The ferrous metallurgical installation shown schematically in FIG. 1 is of the "COREX" type and is adapted to supply an electric arc furnace F for the production of liquid steel. The installation comprises essentially: a hopper 1 for the supply of carbon to a fusion-gasification furnace 2; a shaft furnace 3 for direct prereduction of ferrous mineral; purification devices 4 and 5; a cyclone 6; a device 7 for purification and cooling; a blower 8; an air separation unit 9; a partial decarbonation unit 10; a heat exchanger 11; a reheater 12; and a shaft furnace 13 for direct reduction of ferrous mineral.

In operation, ferrous mineral is introduced at the top of the shaft furnace 3 by means of a supply device 14. A reducing gas, from the top of furnace 2 and with particulates removed in 6, is introduced into the shaft furnace 3 via a conduit 15. The iron mineral thus prereduced is transferred to the furnace 2 by means of endless screw devices 16. The furnace 2 also receives carbon from the hopper 1, scrap iron, recycled particulates, via a conduit 17, from the cyclone 6, and the oxygen produced by the unit 9 is injected via nozzles 18 provided at the base of the furnace 2.

The gas from the head of the shaft furnace 3 is purified in 4 and sent via a conduit 19 to the decarbonation unit 10. The excess gas from the cyclone 6 is purified and cooled in 7. A portion of this gas is then injected, via a conduit 20, into the conduit 19, whilst the rest is recycled by means of the blower and mixed with the top gas from the furnace 2, as cooling gas for this latter.

The partially decarbonated gas from the unit 10 is reheated in 11 by indirect heat exchange, then in 12 by partial combustion with the oxygen from the unit 9 via a conduit 21, then introduced, as reducing gas, into the shaft furnace 13, which is supplied at its head by means of suitable device 22 with ferrous mineral. The gas from the head of furnace 13 is purified in 5 and recycled: a portion rejoins the conduit 19 via a conduit 23, and the rest is sent to the grill of the exchanger 11 via a conduit 24, as preheating gas.

The liquid metal produced in the bottom of furnaces 2 and 13 is sent to the electric arc furnace F for oxygen refining.

Thus, the oxygen produced by the unit 9 via a conduit 25 is used to supply the furnace 2, the reheater 12 and the electric arc furnace F. It can also be used for other purposes, for example, as shown, to aid in the transport of recycled particulates into the furnace 2, by injection in the conduit 17.

The unit 9 necessarily produces nitrogen at the same time as oxygen. At least a portion of this nitrogen is increased in value in the unit 10, to which the nitrogen outlet of the unit 9 is connected by a conduit 26, under conditions which will now be described with respect to FIGS. 2 and 3. There is shown at 27 the conduit for production by unit 10 of partially decarbonated reducing gas, and by 28 the acid gas outlet of the unit 10, which constitutes the outlet of the residual gas.

In the example in question, the gas treated by the unit 10 has an approximate composition of 35% $CO_2$, 48% CO and 17% $H_2$.

Figure 2:
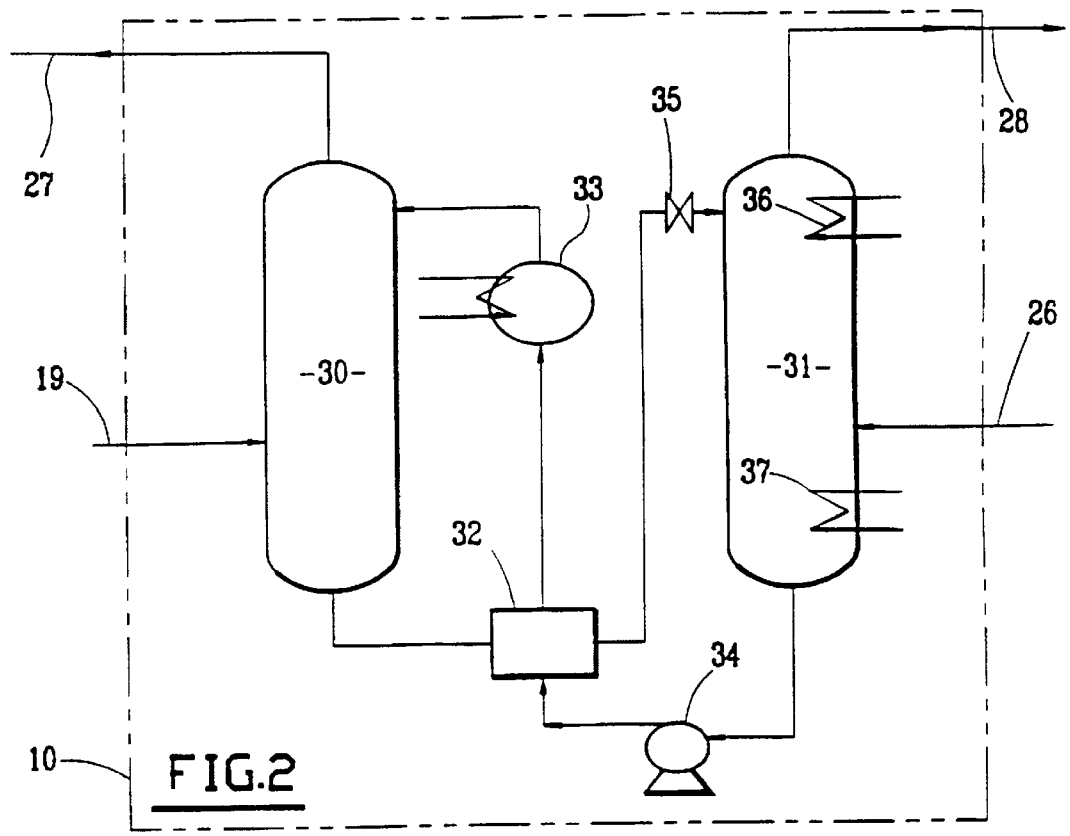
FIGS. 2 and 3 show schematically first and second processes of partial decarbonation in the installation of FIG. 1.

The decarbonation unit 10 shown in FIG. 2 is a unit for washing with amines which comprises essentially an absorber 30, a regeneration tower 31, a heat exchanger 32, a water refrigerator 33, a circulation pump 34 and an expansion valve 35. The tower 31 comprises at its head a water cooler 36 and at its base a steam reboiler 37.

In operation, the absorber 30 carries out the partial decarbonation of the treated gas, introduced at its base, by washing with amines. The partially decarbonated reducing gas, which leaves the top of the absorber 30 via the conduit 27, has a $CO_2$ content at most equal to 5% and, in this example, substantially equal to this value.

The solvent used is MDEA (methyldiethylamine), and is introduced at the head of the absorber 30. This solvent loaded with $CO_2$, withdrawn from the base of the absorber, is introduced, after reheating in 32 and expansion in 35, into the head of the tower 31 there to be regenerated. The liquid at the base of this tower (regenerated solvent) is recycled at the head of the absorber 30 via the pump 34 and the cooling exchangers 32 and 33. The residual acid gas is removed from the top of the tower 31, via the conduit 28.

The nitrogen is introduced into the lower portion of the tower 31. This has the effect of lowering the partial pressure of $CO_2$ in this tower, which promotes its desorption. Moreover, thanks to the presence of the nitrogen, the quantity and the partial pressure of water vapor in equilibrium are reduced. There results a substantial reduction of the quantities of water vapor and of cooling water necessary in 37 and 36 respectively.

Figure 3:
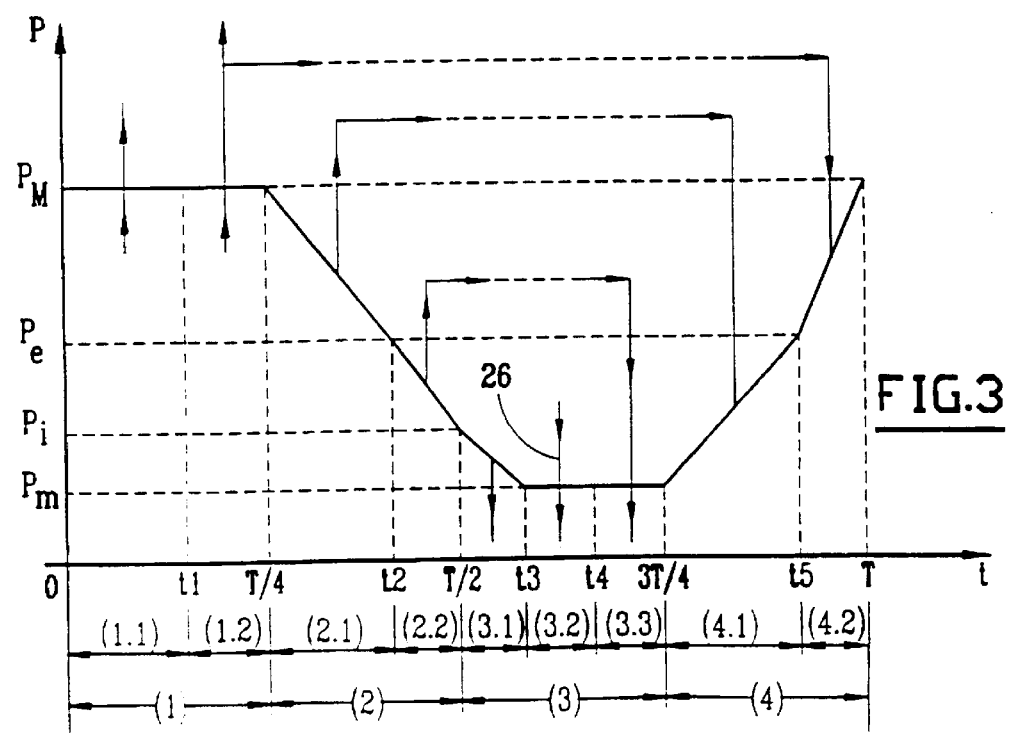

In the examples shown in FIG. 3, the partial decarbonation is carried out by selective absorption of the $CO_2$ on a zeolite 5A heated to a temperature higher than 50° C. and typically about 70° C., by a process of the PSA type (Pressure Swing Adsorption). The diagram of FIG. 3 shows an example of a PSA process using at least one unit with four adsorbers in parallel, not shown, provided with conduits, with control means and with conventional regulation means.

By means of this unit, there is carried out for each adsorber a cycle which is illustrated in FIG. 3 with reference to one of the adsorbers. If T designates the duration of the cycle, the operation of the second adsorber is shown by offset for a time T/4, that of the third adsorber by offset for a time T/2, and that of the fourth adsorber by offset for a time 3T/4.

In FIG. 3, in which the time t is shown on the abscissa and the absolute pressures P on the ordinates, the lines indicated by arrows indicate the movements and destinations of the gaseous flows; when the arrows are parallel to the ordinates, they indicate moreover the direction of circulation in the adsorber; when an arrow is in the direction of increasing ordinates (toward the top of the diagram), the current is called co-current in the adsorber; if the arrow directed upwardly is located below the line indicating the pressure in the adsorber, the flow penetrates the adsorber from the inlet end of the adsorber; if the arrow directed upwardly is located above the line indicating pressure, the flow leaves the adsorber by the outlet end of the adsorber, the inlet and outlet ends being respectively those of the gas to be treated and of the gas withdrawn in isobaric production phase; when an arrow is in the direction of decreasing ordinates (toward the bottom of the diagram), the current is called counter-current, in the adsorber. If the arrow directed downwardly is located below the line indicating the pressure in the adsorber, the current leaves the adsorber by the inlet end of the adsorber; if the arrow directed down-wardly is located above the line indicating pressure, the flow penetrates the adsorber by the outlet end of the adsorber, inlet and outlet ends being always those of the gas to be treated and of the gas withdrawn in isobaric production phase. On the other hand, there are indicated in full lines the gaseous currents which relate exclusively to the adsorber in question and in broken lines the gaseous flows from or in the direction of the other adsorbers.

Thus, for the first adsorber, the cycle comprises the following phases:

(1) From t=0 to T/4: co-current adsorption phase, at high pressure cycle $P_M$, which is typically of the order of 4 bars. This phase is broken down into two stages:

(1.1) From t=0 to t1: the mixture to be treated is introduced into the inlet of the adsorber, and the partially decarbonated mixture (reducing gas) is withdrawn at its outlet and constitutes the production gas of the adsorber.

(1.2) From t1 to T/4: this stage differs from the preceding by the fact that a portion of the production gas is sent to the outlet of another adsorber in the final recompression step described later.

(2) From T/4 to T/2: co-current decompression phase, which is subdivided into two stages:

(2.1) From T/4 to t2: first co-current decompression, with pressure balancing with another adsorber in the first recompression step described later. The outlet of the adsorber is then connected to that of this other adsorber, until the two pressures have the same value $P_e$.

(2.2) From t2 to T/2: second co-current decompression from $P_e$ to an intermediate pressure $P_i$, the outlet of the adsorber being connected to that of another adsorber in the final elution stage described later.

(3) From T/2 to 3T/4: purge and counter-current elution phase. This phase brakes down into three stages:

(3.1) From T/2 to t3: counter-current purge stage, in the course of which the inlet of the adsorber is connected to the atmosphere until the pressure reaches the low cycle pressure $P_m$, which is typically atmospheric pressure.

(3.2) From t3 to t4: the first counter-current elution step with nitrogen from the air separation unit 9, via the conduit 26, at pressure $P_m$, the inlet of the adsorber being open to the air.

(3.3) From t4 to 3T/4: final counter-current elution stage with gas from another adsorber in stage (2.2) of second decompression, the inlet of the adsorber being open to the air.

(4) From 3T/4 to T: counter-current recompression phase from $P_m$ to $P_M$. This phase is broken down into two stages:

(4.1) From 3T/4 to t5: first counter-current recompression stage, from $P_m$ to $P_e$, by pressure balancing with another adsorber in first decompression stage (2.1).

(4.2.) From t5 to T: final counter-current recompression stage, by means of production gas from another adsorber in adsorption stage (1.2).

To avoid the use of a gas accumulator in the unit 10, the durations of stages (2.2) and (3.3) are identical, and it is of course the same for the balancing stages (2.1) and (4.1).

The use of heated zeolite 5A is particularly interesting in the framework of the overall process of FIG. 1, in which heat is available to heat the adsorbers. Thus, the zeolite 5A has a high $CO_2/CO$ selectivity, which leads to high output, and when it is heated, it can be easily desorbed.

Moreover, thanks to the use of elution nitrogen in stage (3.2), the partial pressure of the $CO_2$ in the adsorber is reduced. This permits eliminating more effectively the $CO_2$ and as a result improving both the productivity and the output of the process, all things being equal.

The same is true for the process of FIG. 2, In which the nitrogen used is first heated in the refrigeration cycle of the air compressor of the air separation unit 9, or else by heat exchange with the gas to be treated in the course of cooling, for example in the apparatus 7 of FIG. 1.

What is claimed is:

1. A ferrous metallurgical process, which comprises:
    separating air into nitrogen and oxygen in an air separation unit;
    consuming oxygen thus produced in at least one step of the ferrous metallurgical process;
    partially decarbonating a gas from the ferrous metallurgical process;
    using said partially decarbonated gas to carry out a reduction reaction of the ferrous metallurgical process;
    wherein the partial decarbonation comprises, in a cyclical fashion, a fixation phase of $CO_2$ with a fixation product; then a regeneration phase of said fixation product in a reactor; and, in the course of the regeneration phase, introducing into the reactor the nitrogen produced by the air separation unit.

2. The process according to claim 1, wherein the fixation of the $CO_2$ is an absorption by solvent, and said reactor is a regeneration tower for said solvent into which nitrogen is introduced.

3. The process according to claim 2, wherein the solvent comprises at least one amine, and the regeneration tower comprises at its base a steam reboiler and at its head a water condenser.

4. The process according to claim 3, wherein the amine is methyldiethylamine (MDEA).

5. The process according to claim 1, wherein the fixation of the $CO_2$ is a selective adsorption in at least one adsorber of a cyclic Pressure Swing Adsorption (PSA) process, the nitrogen being introduced counter-currently into the adsorber, during its regeneration, in an elution stage of said adsorber at the low pressure ($P_m$) of the PSA cycle.

6. The process according to claim 5, wherein the selective adsorption is carried out in four adsorbers.

7. The process according to claim 6, wherein the PSA cycle comprises, at the low pressure ($P_m$) of the cycle, an elution step with nitrogen followed by a counter-current elution step with a gas withdrawn co-currently from another adsorber in the course of decompression.

8. The process according to claim 5, wherein the adsorber comprises a zeolite 5A adsorbent heated to a temperature higher than about 50° C.

9. The process according to claim 1, constituting a combined process of gassification of carbon and direct reduction of iron mineral, said gas being a gas resulting from at least one of the gassification and the direct reduction of iron mineral.

10. A ferrous metallurgical installation, comprising:
    at least one first apparatus for consuming oxygen;
    a second apparatus, optionally separate from the first apparatus, for producing a gas which contains $CO_2$;
    a partial decarbonation unit for partially decarbonating said gas;
    a third apparatus, optionally separate from the first and second apparatus, for carrying out a reduction reaction;
    supply means for supplying partially decarbonated gas to said third apparatus;
    an air separation unit structured and arranged to separate air into nitrogen via a nitrogen outlet and oxygen necessary for the first apparatus;
    the partial decarbonation unit comprising fixation means for fixation of the $CO_2$ with a fixation product, and regeneration means for regenerating said fixation product; and
    wherein the nitrogen outlet of the air separation unit is connected to the regeneration means.

11. The installation according to claim 10, wherein the partial decarbonation unit comprises an adsorber, a regeneration tower, and circulation means for circulating a solvent for the $CO_2$ from the adsorber to the regeneration tower and vice versa; the tower comprising a nitrogen inlet connected to the nitrogen outlet of the air separation unit.

12. The installation according to claim 10, wherein the partial decarbonation unit is a Pressure Swing Adsorption (PSA) unit comprising at least one adsorber, and means for selectively connecting the outlet of each adsorber to the nitrogen outlet of the air separation unit.

13. The installation according to claim 12, wherein each adsorber is provided with heating means, and includes a zeolite 5A adsorbent.

* * * * *